Patented Apr. 6, 1954

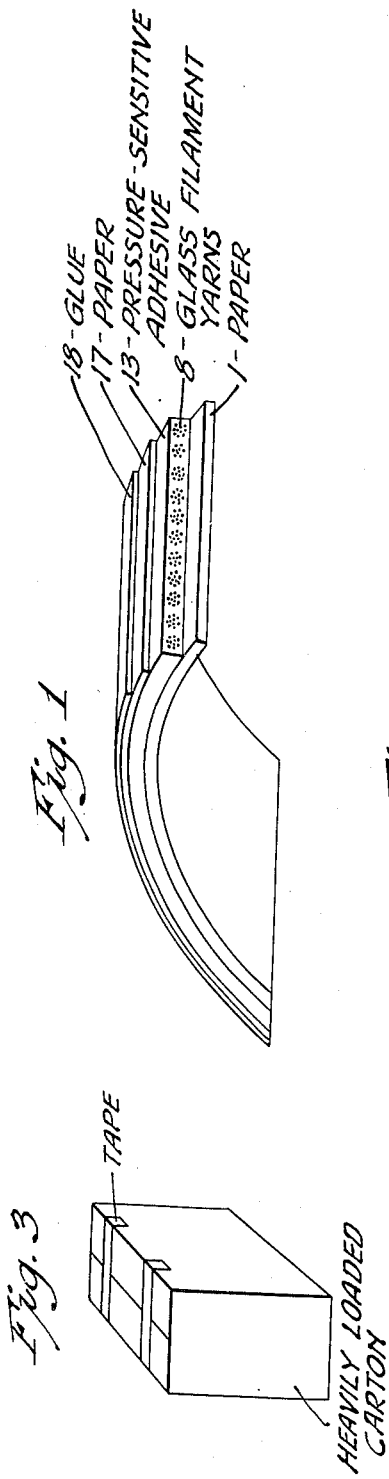

2,674,556

UNITED STATES PATENT OFFICE 2,674,556

GUMMED STRAPPING TAPE

Walter H. Pahl, Western Springs, and Keith H. Williams, Aurora, Ill., and Hubert J. Tierney, St. Paul, Minn., assignors, by mesne assignments, to Minnesota Mining & Manufacturing Company, St. Paul, Minn., a corporation of Delaware Application August 17, 1950, Serial No. 180,046

1 Claim. (Cl. 154—53.5)

This invention relates to lineally reinforced gummed paper tape, sometimes referred to as "strapping" tape.

Prior constructions of this type of tape have included the addition to the normal combination of backing and adhesive, of a plurality of elongate members or elements (such as threads, strands or fibers) that have a high tensile strength, such elements being in or on the backing, in or on the adhesive, or between the adhesive and the backing.

Such prior constructions, however, have been unsatisfactory in many ways.

An objective therefore is to provide a lineally reinforced gummed paper tape of improved construction and performance, and having a tensile strength of at least 100 pounds per inch width.

The invention provides a tape having a backing and a coating of a normally non-tacky adhesive on one surface of the backing, the said backing being a laminated structure comprising two sheets of paper adhered to each other by a layer of a rubber-resin type pressure-sensitive adhesive which is waterproof and is stably and normally tacky, and a non-woven layer of continuous hair-like glass filaments fully embedded within the adhesive layer and unified therewith, the filaments being aligned lineally in respect to the tape. The filaments may be single or in yarns.

An illustrative embodiment is described below and illustrated in the accompanying drawings in which:

Figure 1 is a schematic diagram showing in perspective a length of the tape;

Figure 2 shows a method and apparatus for its making; and

Figure 3 shows a carton bound or "strapped" with the tape.

A sheet 1 of 60 pound kraft paper (kraft paper having a ream weight of 60 pounds per 3000 square feet) is led from a supply roll 2 thereof through a coating apparatus 3 where a layer of a stably and normally tacky adhesive 4 of the rubber-resin type that is commonly used as the adhesive layer in pressure-sensitive adhesive tapes, is applied. Thereafter it passes through a drying oven 5 and thence between two laminating rollers 6 and 7 where a layer of continuous glass filament yarns 8 is applied to the adhesive side.

The yarns are drawn from a warp beam 9 to combs 10 and thence to the laminating rollers 6 and 7 where, in going through the nip, they are pressed into the surface of the soft, dried, coating of adhesive 4 to form a lineally aligned mono-layer of continuous yarns 8 that are held in place by the tackiness of the adhesive.

The laminated sheeting proceeds horizontally, yarn side up, to a second coating apparatus 11 which applies a layer of adhesive 12 to the yarn side of the sheeting.

The layers 4 and 12 of adhesive commingle so that they form a single adhesive layer 13 having a layer of filament yarns embedded therein.

After next passing through a second drying oven 14, the sheeting is then directed between a second set of laminating rolls 15 and 16 where a pregummed sheet 17 of 20 pound kraft paper, its exposed surface having been previously coated with a layer 18 of high strength glue, is applied to the adhesive side of the laminated sheeting.

The pregummed paper sheet 17 is led from a supply roll 19 thereof and its uncoated side is pressed into contact with the pressure-sensitive adhesive layer 13, thus completing the laminated structure shown in Figure 1. The finished product is wound up in a storage roll 20.

The adhesive layer 13 being pressure-sensitive, the lamination at the rolls 15 and 16 may take place at room temperature. This avoids any deleterious effects that might come from the application of heat.

There are numerous alternatives.

For example, the paper 17 may be uncoated when it is laminated to the adhesive layer 13, if desired. In such case, the glue layer 18 may be applied after the laminated sheeting has passed from the roll 15 and is on its way to the storage roll 20.

Other high strength normally non-tacky adhesives, such as water-activatable or heat-activatable adhesives, may be used in place of the glue 18.

The weights of the papers may vary.

A layer of 100 yarns per inch of 300 denier 60 filament yarn glass will produce tape having a tensile strength of more than 400 pounds per inch width.

The glass filaments may be of other sizes and count.

The adhesive is one of the various rubber-resin type pressure-sensitive adhesives of the type well known in the art as suitable for the adhesive coating on pressure-sensitive adhesive tapes; and such adhesives are the ones meant herein by the expression "rubber-resin type pressure-sensitive adhesive." These adhesives are water-insoluble and aggressively tacky. They have a rubbery base of natural or synthetic rubber which provides cohesion (internal strength) and elasticity (a retractive force when stretched and retraction when released after stretching); and this rubber base is modified by blending with a compatible tackifier resin (such as rosin or ester gum) which serves to increase adhesion (tackiness) and decrease cohesion, with an attendant increase of stretchiness (elongation under low stresses) and decrease of elasticity.

These rubber-resin tape adhesives have a proper four-fold balance of adhesion, cohesion, stretchiness and elasticity. They are termed "eucohesive" by which it is meant that they are more cohesive than adhesive.

Certain synthetic polymers are inherently tacky and eucohesive and possess the above-mentioned four-fold balance of properties, and can be used as pressure-sensitive tape adhesives, thus being equivalents of the rubber-resin adhesives and hence they may be regarded as being of the rubber-resin type. An example is a 75:25 copolymer of 2-ethyl-butyl-acrylate and ethyl acrylate.

The lineally aligned, continuous, hair-like, glass filaments and the surrounding rubber-resin type pressure-sensitive adhesive provide a reinforced adhesive layer 13 of novel construction having novel properties. These mono-fiber filaments are individually encased and permanently bonded by the aggressively tacky adhesive to which they are individually united, even when present in twisted yarns.

This adhesive has elasticity and it is quite stretchy. This can be clearly demonstrated by separating the adhesive layer 13 from the other backing layers, as by soaking a length of the tape in water and then peeling the paper layers 1 and 17 from either side of the filament-containing adhesive layer 13. The said separated adhesive layer 13 can be pulled crosswise between the fingers to two or three times its initial width without rupturing. Because of this property of the adhesive, together with the fact that it is permanently bonded to the filaments by virtue of its aggressive tackiness, the filaments are capable of movement relative to each other and relative to the backing without rupture of the bond between the adhesive and the filaments, without rupture of the bond between the adhesive and the paper layers, and without internal rupture of the adhesive. Not only does this make for a high degree of lengthwise and crosswise flexibility but it permits of elongation of the yarns or free filaments when the tape is stressed.

A very important feature is that this structure allows a relative shifting of the mono-fiber filaments so that when the tape is subjected to non-uniform stresses the load will be more effectively distributed as between the various filaments, thereby more nearly equalizing the strains on the yarns or free filaments and increasing the effective resistance of the tape to breaking. This is of particular value in obtaining a maximum resistance to shock stresses such as are produced, for example, when a bundle of steel rods is dropped on the floor and the adhesive tape straps are suddenly subjected to strong bursting forces which are non-uniform across the width and along the length of the tape.

This is in direct contrast to the aforementioned reinforced gummed paper tapes heretofore known to us, wherein the reinforcing strands or fibers are held by an adhesive that loses its tack after application, such for example as glue, or by a tacky adhesive that has no stretch. If in such a tape, the stress and strain of use causes sufficient relative movement between a strand and the adhesive to break the strand loose from the adhesive, the adhesion between the two is never restored and the tape becomes weakened at that point. In the tape of the present invention, however, the adhesion between the filaments and the adhesive is never broken.

In the new tape of the present invention, a series of continuous mono-fiber filaments are clamped, as it were, along their full lengths by permanently adherent adhesive, and this adhesive is highly cohesive. The effect of this is to increase the effective tensile strength of the embedded yarns or free filaments, their combined tensile strength being greater than the aggregate strength of an equal number of uncoated yarns or free filaments.

The adhesive further serves to absorb and damp shock forces because of its yieldable and resilient nature, thereby increasing the effective strength of the yarns or free filaments in respect to shock stresses. It should be noted that the adhesive has a low tensile strength per se, a layer of non-reinforced adhesive being quite easily pulled out between the fingers to the breaking point. Hence it is evident that a combination or coactive effect is involved.

A further co-active effect is involved in respect to the backing. The paper sheets 1 and 17 are clamped to the layer of yarns or free filaments by the tacky, stretchable, adhesive. When the tape is elongated under a lengthwise pull it is found that the paper can elongate to a greater extent before rupture than otherwise is the case. Moreover, if a paper is used which will break before the filaments break, the continuity of the tape and its lengthwise strength is retained since the filaments are the load-carrying elements.

The glass filaments do not adhere to rubber. A continuous man-made filament which is encased by rubber can be pulled out, being a smooth-surfaced cylinder held only by friction. This is in contrast to natural fibers. A yarn formed of twisted continuous glass filaments has only a limited degree of anchorage to rubber in which encased. In the present gummed strapping tape the glass yarns and filaments require no special treatment in order to be firmly bonded, owing to the fact that the rubber-resin type adhesive, unlike rubber per se, wets the fiber surfaces and has a strong specific adhesion to them. And as above pointed out, this adhesive bond is not broken by movement of the filaments inasmuch as the adhesive is very stretchy. The wetting action of the adhesive also facilitates its penetration between the filaments so as thoroughly to contact their surfaces.

Since the yarns or filaments are aligned and run straight they are in a condition of maximum strength, unlike the undulating threads of woven cloth which cross over each other and bear into each other when a strong pulling force is applied. This also makes for greater lengthwise and crosswise flexibility, and there are no fiber ends exposed at the side edges of the tape. The yarns can be closer together than in woven cloth, and untwisted filaments can be used. These factors all contribute to making possible extremely strong adhesive strapping tapes having maximum flexibility and suppleness and minimum thickness.

The present adhesive strapping tape also has novel structural properties in that the lengthwise tensile strength and crosswise tear strength are mainly due to the lineally aligned filaments embedded within the pressure-sensitive adhesive (i. e. to the filament-reinforced pressure-sensitive adhesive layer 13), whereas the crosswise tensile strength and lengthwise tear resistance are mainly due to the paper. The paper layers and the reinforced adhesive layer thus perform distinct functions in respect to strength properties. Crosswise tensile strength and lengthwise tear strength are of secondary importance for strapping purposes. The present construction avoids an unnecessary degree of crosswise tensile strength and lengthwise tear strength and thereby makes it possible to employ ordinary untreated paper for the backing.

Thus the particular tape structure of the present invention has a peculiar and useful combination of capacities and characteristics which are not possessed by the aforementioned varieties of reinforced gummed paper tape known to us.

As indicated by the name "strapping tape," it finds particular utility when used to accomplish the work of a band or strap to bind or tie bundles, cartons or packages.

Figure 3 illustrates such a use. When cardboard cartons are used to hold very heavy materials, metal bands are usually required to bind them. Such a non-adherent band must go around the entire carton in order to be fastened. Tapes made according to the present invention, however, have tensile strengths sufficient to enable them to replace such metal bands; and being gummed, can be adhered to the carton so that the tape need not encircle the carton, as must the metal band, thus being the cheaper both in respect to initial cost and quantity used. Additionally, metal bands tend to weaken the carton by cutting it at the corners, whereas the tape of this invention not only avoids such cutting and weakening but serves actually to reinforce and to strengthen the carton.

We claim:

A gummed tape of the character described comprising a backing and a coating of a normally non-tacky adhesive on one surface of the backing, the said backing being a laminated structure comprising two sheets of paper adhered to each other by a layer of a rubber-resin type pressure-sensitive adhesive which is waterproof and is stably and normally tacky, and a non-woven layer of continuous hair-like glass filaments fully embedded within the adhesive layer and unified therewith, the filaments being aligned lineally in respect to the tape.

References Cited in the file of this patent

UNITED STATES PATENTS

| Number | Name | Date |
| --- | --- | --- |
| 1,167,466 | Angier | Jan. 11, 1916 |
| 1,446,094 | Jackson | Feb. 20, 1923 |
| 1,872,316 | Meeker | Aug. 16, 1932 |
| 2,089,405 | Newkirk | Aug. 10, 1937 |
| 2,293,246 | Fay | Aug. 18, 1942 |
| 2,444,830 | Kellgren et al. | July 6, 1948 |
| 2,561,781 | Bruce | July 24, 1951 |